July 14, 1953 M. DE VRIES 2,645,301
SOUND FILTER FOR MICROPHONES AND TELEPHONES
Filed July 19, 1950
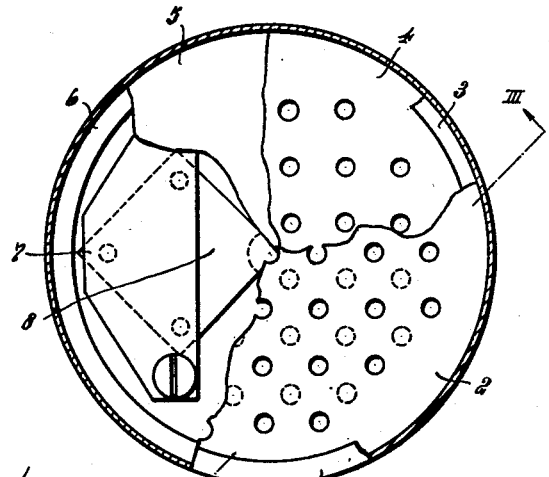
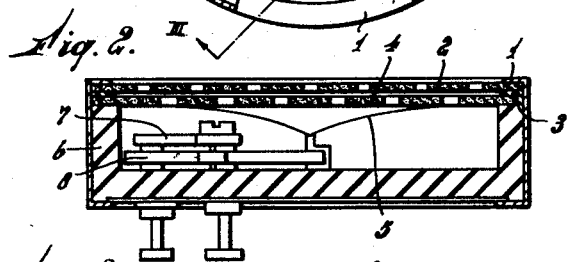
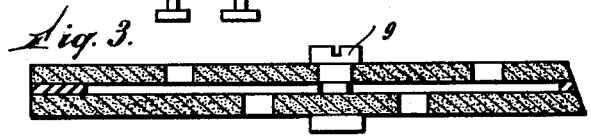
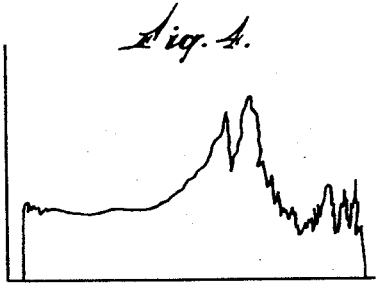 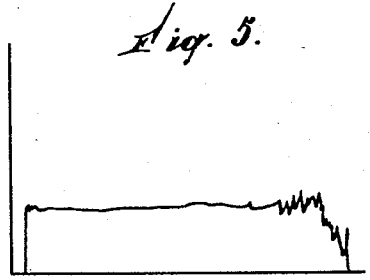
INVENTOR.
MACHIEL DE VRIES
BY Wenderoth, Lind & Ponack
ATTORNEYS Patented July 14, 1953

2,645,301

UNITED STATES PATENT OFFICE 2,645,301

SOUND FILTER FOR MICROPHONES AND TELEPHONES

Machiel de Vries, Amsterdam, Netherlands

Application July 19, 1950, Serial No. 174,734
In the Netherlands May 11, 1950

1 Claim. (Cl. 181—33)

This invention relates to a filter for sound vibrations and to a microphone and telephone provided therewith.

Many microphones, for example crystal microphones, have a characteristic curve which at a given frequency shows a peak in the audibility range. Attempts have been made to attain a more flat characteristic curve by displacing the peak to the range of the highest frequencies, which generally can be achieved by a lighter construction, smaller dimensions and a greater resilience of the moving parts. This, however, reduces the output which must be compensated for by a more expensive amplifier.

Attempts have also been made to remove the peak by the use of damping material, such, for example, as a filter comprising plates of fibrous material or textile supported by metal gauze. The characteristic curve of the damping of such a filter is rather flat, however, so that if the peak is damped out there is also a considerable damping out of the other frequencies simultaneously whereby the effective output is adversely affected.

A filter is required, therefore, which only removes the peak and the characteristic curve of whose damping corresponds with the characteristic curve of the microphone without filter. Its construction must be simple, suitable for mass production, while slight differences between the microphones of a series must be susceptible of being rapidly removed by a simple adjusting device provided on the filter, after said filter has been arranged in the microphone casing.

According to the invention the filter comprises two or a plurality of perforated plates e. g. two or a plurality of metal plates, disposed parallel to one another and spaced by interposed rings of small thickness, so that a thin layer of air is left between said plates.

If the perforations are staggered relatively to one another the sound waves penetrating through the perforations of a plate must spread in the thin layer of air between said plate and the adjacent one before they can penetrate through the openings of said adjacent plate.

The waves of higher frequency are damped to a greater extent thereby than those of lower frequency, but the particular effect which is obtained in this manner is that by the selection of the bore of the perforations, of the degree in which the perforations of successive plates are staggered, and especially by adjusting the space between successive plates, the configuration of the characteristic curve of the filter can be controlled, so that the latter can be correctly positioned whereby the characteristic curve of the microphone becomes remarkably flat without the lower frequencies being weakened. The space between the filter plates can be simply adjusted according to the invention, for example by means of an axially arranged screw bolt. It is also possible to change the staggered relation between the perforations by turning two successive perforated plates relative to each other. The first expedient, however, usually suffices. The desired effect can be satisfactorily attained with two plates.

If the filter is arranged in front of the diaphragm of the microphone, it is desirable for the filter to form an accoustic dynamic whole with the microphone and the filter therefore should be sufficiently coupled to said diaphragm in order to damp the combination of diaphragm and actuating member correctly. In that case the frequencies in the peak range are damped to the greatest extent.

To this end it is necessary for the distance between diaphragm and adjacent filter plate to be small, so that only a very slight mass of air is enclosed between said diaphragm and said plate. Good results were also obtained with a diaphragm which was not flat but slightly conical and which had its edge bearing direct or via a thin intermediate ring against the edge of the said filter plate. Also in this case a thinner layer of air between diaphragm and filter caused a stronger damping.

The combination of an energy converting member and a filter as described here with regard to a microphone can generally also be used conversely for converting electric energy into sound energy. The invention, therefore, can be applied to all microphones, telephones, loudspeakers etc. The filter plates can be mass-produced and assembled cheaply by simple mechanical treatments.

The invention will be illustrated by the accompanying drawing relating to a crystal microphone which was chosen as an embodiment.

Fig. 1 is a plan view of a piezo-electric microphone provided with a filter according to the invention and portions of the upper filter plate, of the lower filter plate and of the diaphragm have been cut away to enable the parts located thereunder to be better seen.

Fig. 2 shows a cross section of the same embodiment.

Fig. 3 shows a large scale section of the filter according to Figures 1 and 2 taken on the line III—III in Figure 1.

Figure 4 shows a characteristic curve obtained with the microphone according to Figures 1 and 2 when used without filter.

Figure 5 shows the characteristic curve which is obtained when the filter is used.

In Fig. 1, which shows a microphone 2-3 times enlarged, a flanged ring 1 holds the upper filter plate 2, which is spaced from the lower filter plate 4 by means of a spacing ring 3, for example, of paper. The staggered relationship of the apertures in the two filter plates is shown in Fig. 3, which is a section on line III—III in Fig. 1, on a larger scale and with a smaller number of apertures.

The lower filter plate is followed by the cone diaphragm 5, the edge of which bears against the edge of the filter plate 4. The casing is designated by 6 and contains a crystal plate 8 supported by a clamping plate 7, a corner of which crystal plate is connected with the top of the cone 5 and is actuated thereby. In Fig. 3 a screw 9 is indicated by means of which the space between the filter plates and as a result the thickness of the intermediate layer of air can be varied. In Figures 1 and 2 said screw has been omitted for clearness' sake.

It will be clear that the filter does not appreciably influence the shape, the dimensions and the weight of the microphone and it can be easily accommodated in the box 6. Also there is an interaction between filter and diaphragm, i. e. not only the filter imparts energy to the diaphragm, but the diaphragm which is made to vibrate also imparts energy to the filter, that is to the air in the filter, so that the undesirable frequencies are repeatedly damped therein if the distance between diaphragm and filter is chosen small enough. Diaphragm and filter, therefore, form a unit, i. e. the diaphragm can be considered as an end-member of the filter. Together with the diaphragm the mass of air between diaphragm and filter plate, as well as the mass of air between the filter plates vibrates, for the two masses of air are connected through the openings of the separating filter plate.

While the filter, regarded as an independent unit, passes the sound waves selectively, it forms in combination with the diaphragm at the same time damping means for the frequencies to be removed. Upon comparing the characteristic curve according to Figure 4 with the one according to Fig. 5 it is seen that the peak in Fig. 4 disappears as soon as the filter according to the invention is mounted, without the lower frequencies being damped.

I claim:

A filter for sound waves comprising a plurality of superposed plates having apertures, said plates being coaxial, parallel to one another and slightly spaced from one another thereby providing a thin layer of damping air between said plates, the apertures in successive plates being arranged in staggered relation to one another, said plates being rotatively adjustable for adjusting the staggered relationship of said apertures, adjustment means adjustably connecting said plates for adjusting the space between the plates, and a ring of compressible material inserted between said plates and constituting spacing means therefor.

MACHIEL DE VRIES.

References Cited in the file of this patent

UNITED STATES PATENTS

| Number | Name | Date |
|---|---|---|
| 1,804,688 | Harrison | May 12, 1931 |
| 1,915,358 | Giles | June 27, 1933 |
| 2,022,060 | Swickard | Nov. 26, 1935 |